Feb. 20, 1945.  D. F. McGILL  2,369,835
FLUID TRANSMISSION MECHANISM
Filed July 22, 1939    7 Sheets-Sheet 1

INVENTOR
DANIEL F. McGILL
BY Harold L. Cook
ATTORNEY

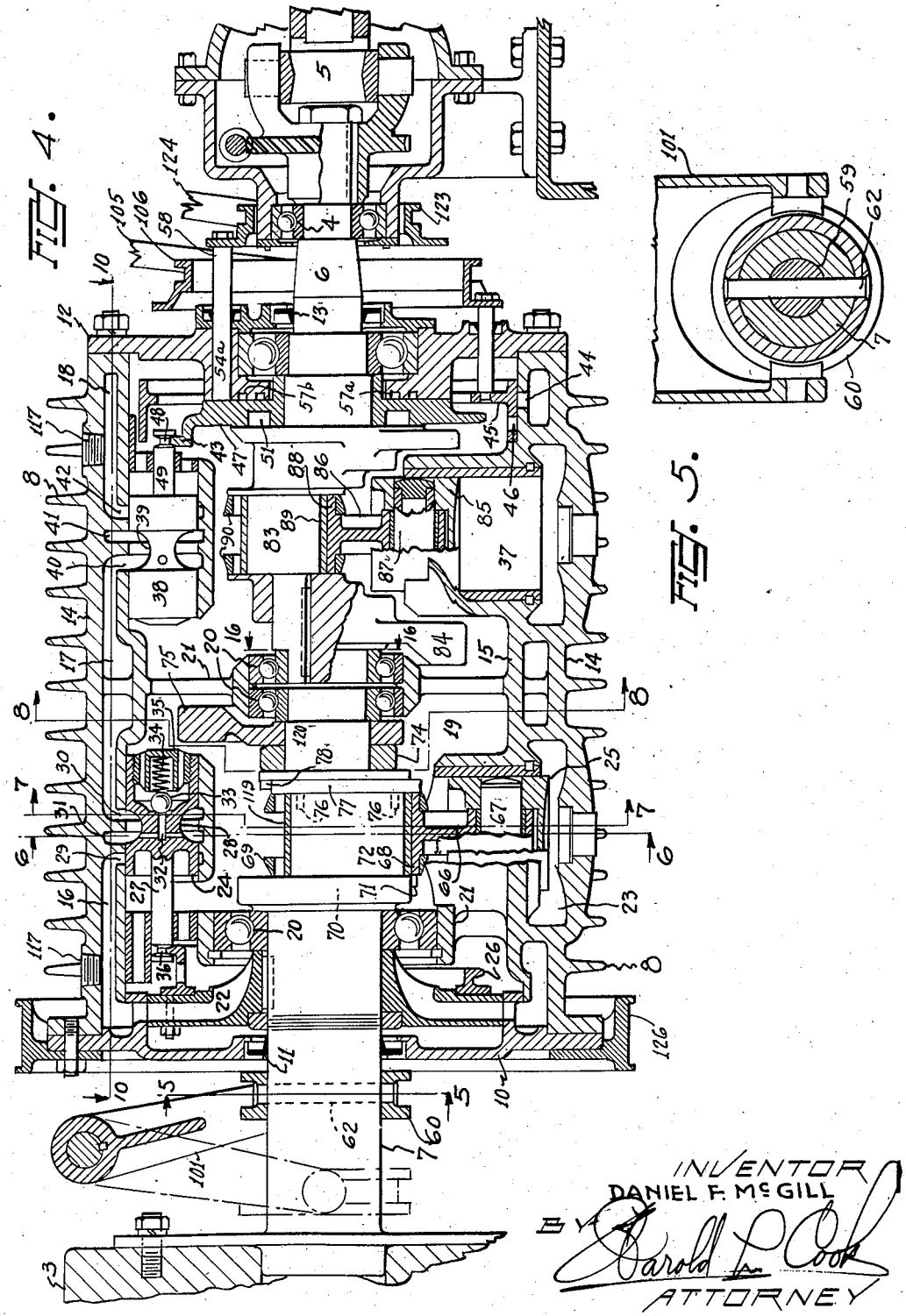

Feb. 20, 1945. D. F. McGILL 2,369,835
FLUID TRANSMISSION MECHANISM
Filed July 22, 1939   7 Sheets-Sheet 3

INVENTOR
DANIEL F. McGILL
BY
ATTORNEY

Feb. 20, 1945.  D. F. McGILL  2,369,835
FLUID TRANSMISSION MECHANISM
Filed July 22, 1939  7 Sheets-Sheet 4
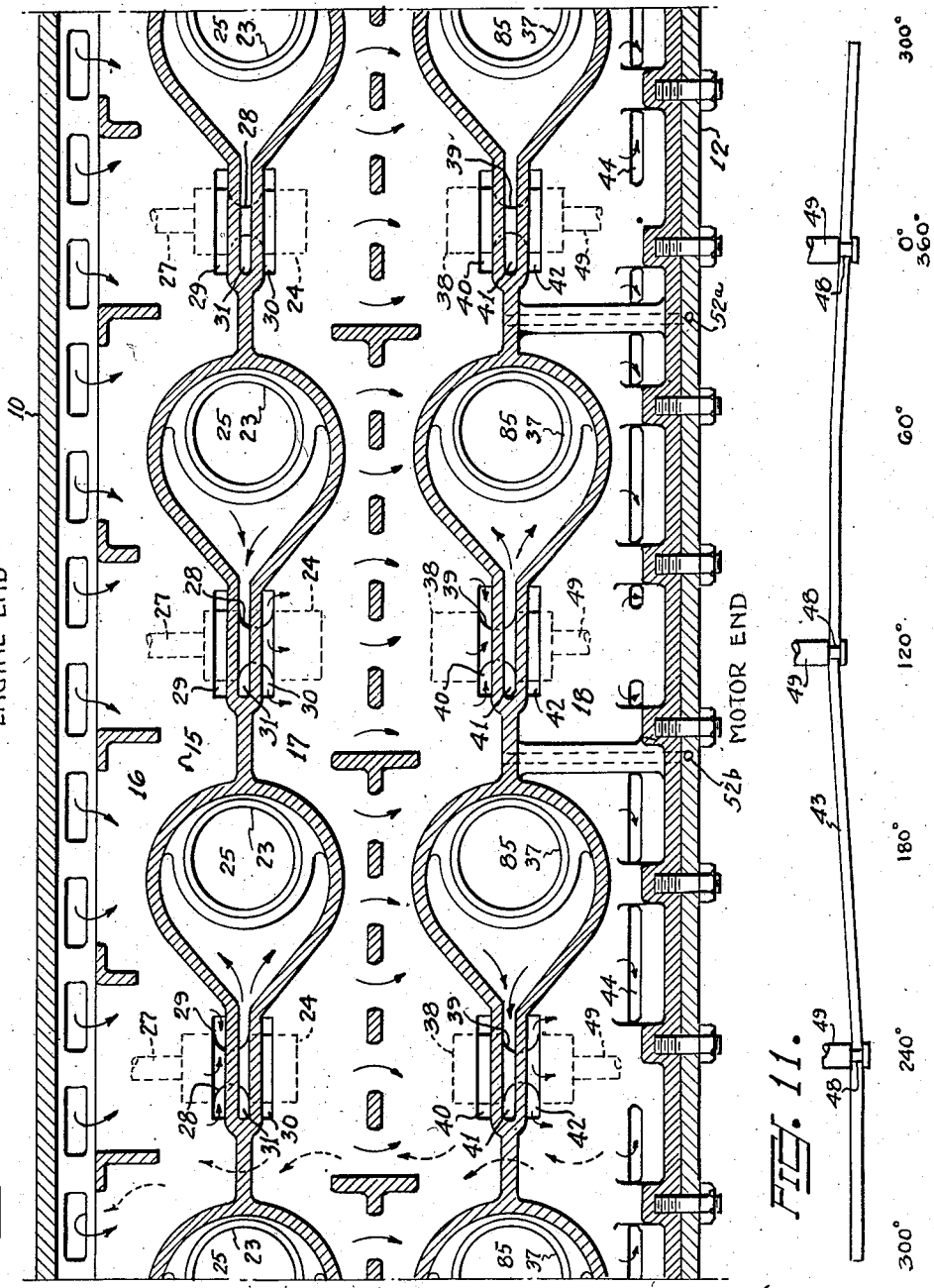
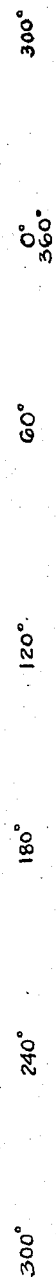
INVENTOR
DANIEL F. McGILL
BY
ATTORNEY Feb. 20, 1945.　　　D. F. McGILL　　　2,369,835
FLUID TRANSMISSION MECHANISM
Filed July 22, 1939　　　7 Sheets-Sheet 5

INVENTOR
DANIEL F. McGILL
BY
Harold P. Coob
ATTORNEY

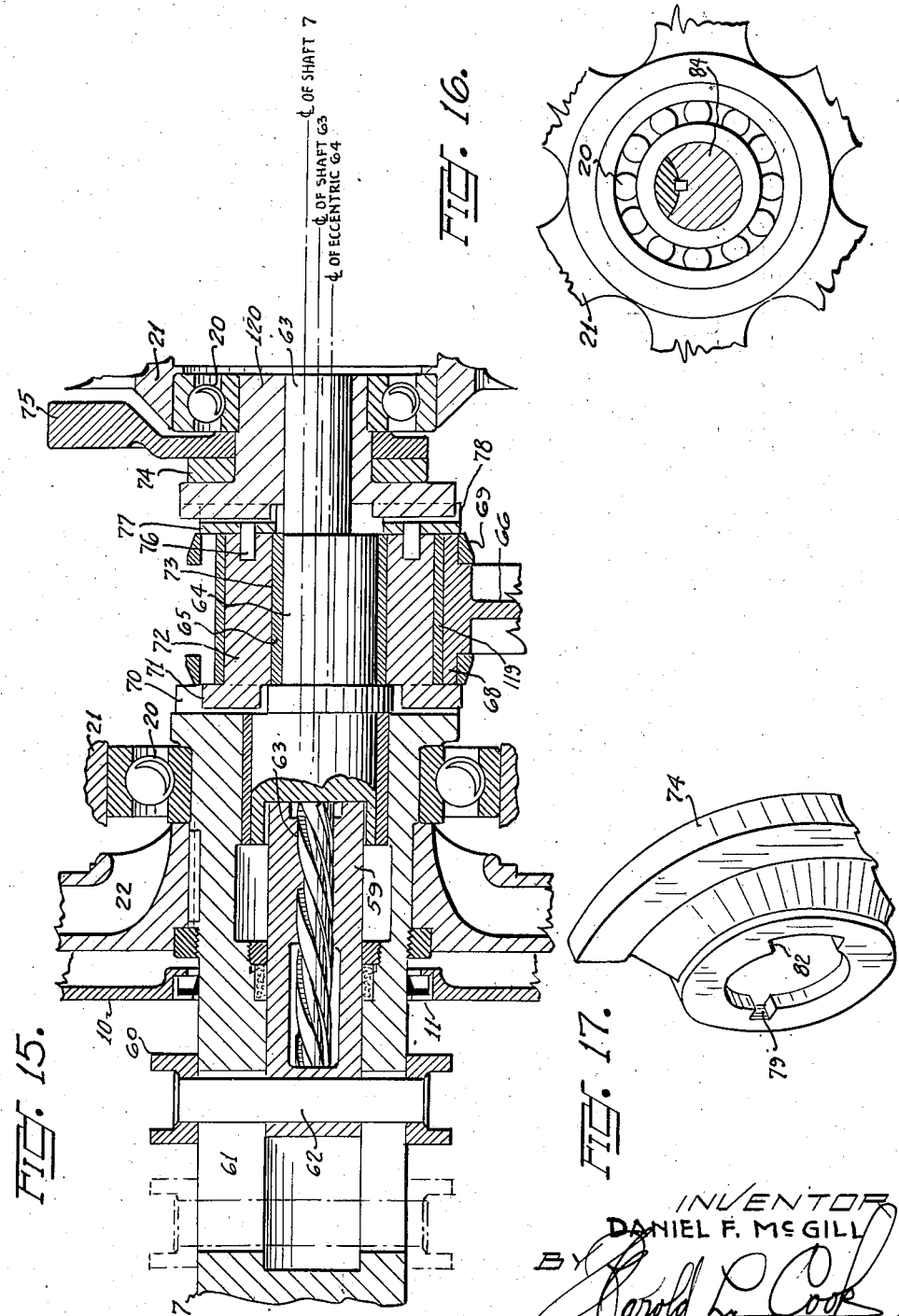

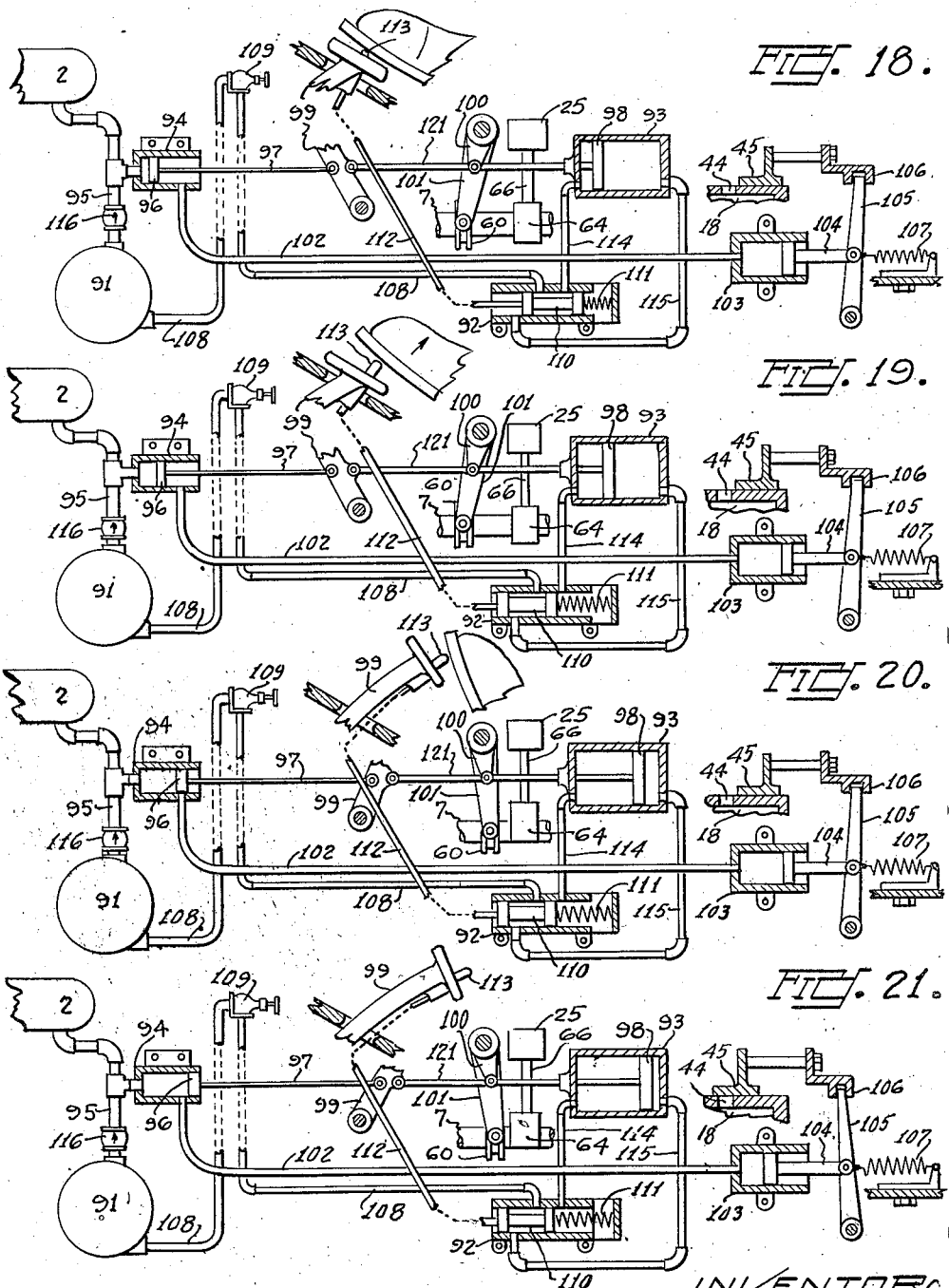

Patented Feb. 20, 1945

2,369,835

UNITED STATES PATENT OFFICE 2,369,835

FLUID TRANSMISSION MECHANISM

Daniel F. McGill, Multnomah County, Oreg., assignor to Donald W. Green, Portland, Oreg., as trustee Application July 22, 1939, Serial No. 285,948

18 Claims. (Cl. 60—53)

This invention relates to a hydraulic or fluid transmission mechanism wherein a fluid medium is employed to transmit torque from a driving shaft to a driven shaft.

The primary object of the invention is to provide a fluid connection between a driving shaft and a driven shaft, which connection will perform all the functions customarily accomplished by the conventional clutch and gear box of an automobile, or by the clutch and reduction gearing of a marine drive or power winch. The transmission is intended for use wherever it is customary to employ either a fixed or variable ratio gear train in the transmission of power.

A further object of the invention is to provide a speed reduction device which will operate at a higher efficiency and with less destructive wear on the moving parts, than the conventional gear box.

A further object of the invention is to provide an automatic transmission wherein the ratio changes gradually, without steps, throughout a wide range, in response solely to load conditions, without the intervention of an operator.

A still further object is to provide a transmission with a wide range of speed ratios for use where very sensitive and accurate speed control is a prime requisite, and for use with constant speed prime movers such as synchronous motors or other non-variable sources of power.

In general the transmission mechanism comprises essentially a drive shaft having a single crank and a series of radially disposed pistons and cylinders; a driven shaft in axial alignment with the drive shaft and also having a single crank and a series of radially disposed pistons and cylinders; and a cylindrical casing member carrying both series of cylinders in integral relation for common rotation about the common axis of the two shafts. The series of pistons and cylinders mounted on the drive shaft constitutes that which hereinafter will be termed a delivery pump, and the series of pistons and cylinders mounted on the driven shaft constitutes that which hereinafter will be termed a receiving pump or motor. Intake and outlet valves operating in timed relation with the pistons in the pump and motor cylinders provide fluid communication between the various cylinders and fluid chambers contained within the periphery of the cylindrical casing, and a separate discharge valve on the outlet side of the motor is provided to establish a fluid lock between the drive and driven shafts for a direct drive.

Means are provided for varying the throw of the crank in the delivery pump, it being possible to reduce the throw to zero to effect a "neutral" or non-driving connection between drive and driven shafts. Driving ratios intermediate between neutral and direct drive are obtainable by adjustment of the crank eccentricity just referred to. In the present embodiment, the invention is illustrated as applied to an automotive vehicle, both manual and vacuum responsive controls being shown for changing the driving ratio in response to power requirements. However, the transmission itself is inherently resilient and responsive in meeting changing power demands, and the external controlling mechanism may be varied to suit the type of installation with which this transmission is used.

While the invention is illustrated herein as applied to an automotive vehicle, no limitation is intended thereby, the invention being of general application in the field of mechanical power transmission regardless of whether the power plant be designed for use in road vehicles, trains, ships, or stationary installations; and also regardless of whether the prime mover be an internal combustion engine or some other type of motor or engine.

With these and other objects and advantages in view, the invention resides in the novel construction and combination of parts hereinafter described, illustrated in the accompanying drawings and set forth in the appended claims; it being understood that various changes in form, proportion, size and details of construction within the scope of the claims may be resorted to without departing from the spirit or sacrificing any of the advantages of the invention.

In the drawings:

Figure 4 is a longitudinal sectional elevation of the transmission unit taken on the line 4—4 of Figure 2.

Figure 5 is a sectional elevation taken transversely of the drive shaft on line 5—5 of Figure 4, illustrating the mechanism for adjusting the eccentric to vary the stroke of the pistons in the delivery pump.

Figure 10 is a development of the interior of the transmission casing on a surface generated by the rotation of the line 10—10 of Figure 4 about the longitudinal axis of the casing. The course of liquid through the device is indicated by the arrows.

Figure 11 is a development of the peripheral surface of one of the cams which operate the valves for the delivery pump and motor, and showing the relative positions of the motor valves around the periphery of the cam.

Figure 15 is a longitudinal sectional elevation taken on the line 15—15 of Figure 6, illustrating the mechanism for adjusting the eccentric to vary the stroke of the pistons in the delivery pump.

Figure 16 is a transverse section taken on the line 16—16 of Figure 4, illustrating the bearing for the inner end of the driven shaft and the manner in which the hub of the counterweight for the motor is utilized as a load carrying means.

Figure 17 is a fragmentary perspective detail of one of the counterweights for the delivery pump.

Figure 1:
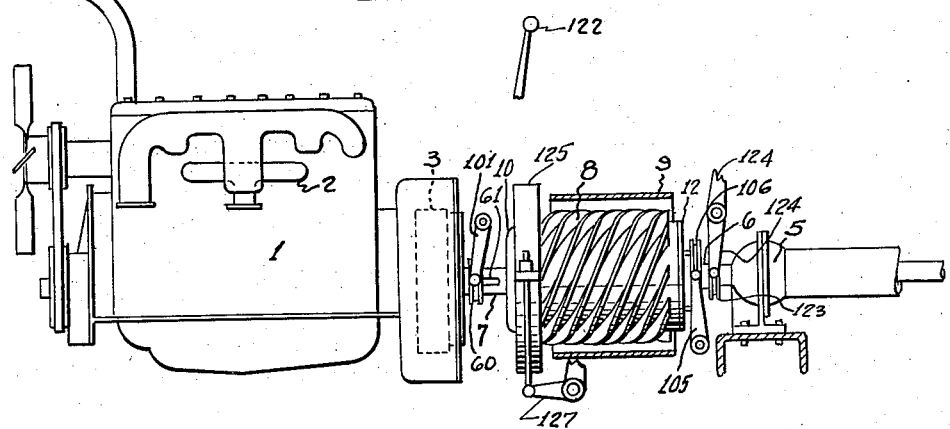
Figure 1 is a side elevation of a hydraulic transmission unit embodying the principles of applicant's invention as same appears when employed to transmit power from the drive shaft of an internal combustion engine to a driven shaft as in an automobile.
Figure 2:
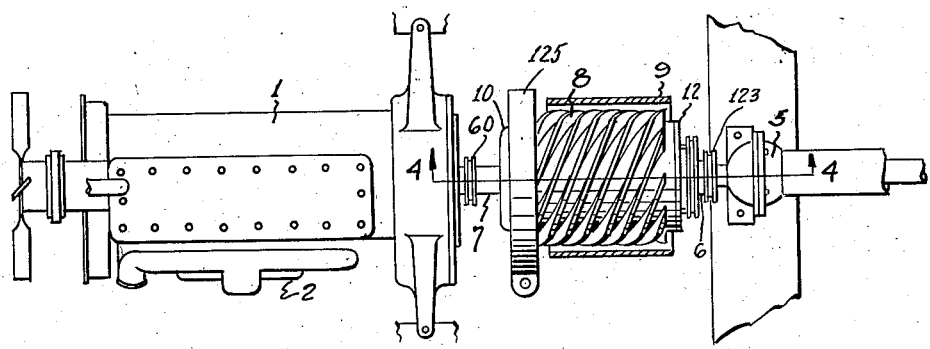
Figure 2 is a plan view of the apparatus illustrated in Figure 1.
Figure 3:
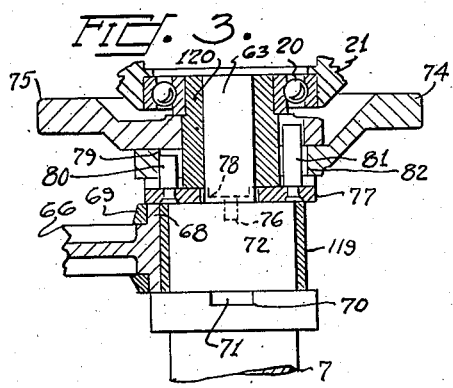
Figure 3 is a sectional elevation of the counterweights at the pump end of the transmission unit, and illustrating the mechanism for controlling the movement thereof, taken on the line 3—3 of Figure 8.

Figures 18 to 21 illustrate diagrammatically the operation of the control elements for automatically changing the ratio of power transmission. These views illustrate more or less schematically the operation of the vacuum units which actuate the mechanism for adjusting the eccentric to vary the stroke of the pistons in the delivery pump, and for opening and closing the control valve. The respective views illustrate the movement of the parts during various driving ratios from a manually controlled neutral position to fully automatic control and direct drive.

Figure 18 illustrates the positions of the control elements when the pump eccentric is in neutral position and the transmission of power at zero.

Figures 19 and 20 illustrate intermediate positions of the control elements showing the initial movements thereof for actuating the mechanism to vary the stroke of the pistons in the delivery pump.

Figure 21 illustrates the normal positions of the control elements with the transmission unit fluid locked by a closed control valve, thereby effecting a direct drive between driving and driven shafts.

By way of illustration, the transmission unit is disclosed as applied to a motor vehicle wherein the motor 1 is equipped with a manifold 2 and a flywheel 3. The transmission is housed in a cylindrical casing positioned between the flywheel 3 and the universal coupling 5 forming a part of the driven shaft 6. At the front or engine end of the transmission unit the drive shaft 7 is bolted to the flywheel 3, and at the rear end of the transmission unit the driven shaft 6 is supported by a bearing 4 carried in the housing of the universal coupling 5, which in turn is supported upon the framework of the vehicle. Exteriorly of the cylindrical casing are outwardly projecting fins 8, each of which traces a spiral path on the external wall of the cylindrical casing. These fins 8 serve as impellers which coact with the adjacent pan 9 for circulating air over the outer surface of the cylindrical casing, whenever rotative movement is imparted thereto, for dissipating the heat generated in the transmission unit.

At the engine end of the transmission unit the cylindrical casing is closed by a cover 10 equipped with an oil seal ring 11 to seal the casing at the drive shaft. Likewise the rear end of the casing is closed by a cover 12 equipped with an oil seal ring 13 to seal the casing at the driven shaft. The cover 12 also contains the bearing for the rear end of the cylindrical casing.

The cylindrical casing is rotatably mounted upon the drive shaft 7 and the driven shaft 6 by means of bearings 20 positioned at suitable intervals throughout the length of the casing, these bearings supporting the casing by means of open frameworks or spiders 21. The cylindrical casing incloses a plurality of series of radially disposed cylinders, one of said series being radially disposed about the drive shaft, and another one of said series being radially disposed about the driven shaft. Operatively connected to the drive shaft are pistons which operate in the cylinders of the first mentioned series, and which constitute therewith a delivery pump; and operatively connected to the driven shaft are pistons which operate in the cylinders of the second mentioned series, and which constitute therewith a motor.

The cylindrical casing comprises an outer wall 14 and an inner wall 15, the space therebetween, with the exception of that occupied by the pump and motor cylinders, being divided into a suction chamber 16, a pressure chamber 17 and a discharge chamber 18. Within the space defined by the inner wall 15, excepting as this space is occupied by the pump and motor assemblies, is the reservoir 19 to which fluid is returned from the discharge chamber 18 by way of the control valve, presently to be described.

From the reservoir 19 the fluid is delivered to the suction chamber 16 by means of a centrifugal pump 22 keyed to the drive shaft 7 adjacent the engine end of the casing. From the suction chamber 16 the fluid is admitted to each of the cylinders 23 of the delivery pump by way of a valve 24, and from each cylinder 23 of the delivery pump the fluid is discharged by way of the same valve 24 into the pressure chamber 17, each valve 24 functioning both as a suction valve and as a discharge valve. The valves 24 are operated by a cam 26 which engages a groove 36 in each valve stem 27, the manner of operation which is presently to be described.

Each of the valves is of the piston and cylinder type. Each valve is formed with a peripheral groove which is at all times in communication with the cylinders, and which provides communication between the cylinders and the intake and discharge ports, respectively, as the valve is actuated to open and close these ports. Inasmuch as each valve operates to admit fluid to the respective cylinders, and to permit the discharge of fluid from the cylinders, each valve performs the functions of two valves of the conventional type. The construction and operation of the valves will best be understood by reference to Figures 4 and 10. It will be noted that the channels or grooves in the valve casing which form the intake and discharge ports are so designed that the pressure of the liquid is applied equally around the periphery of the valve. Likewise the pressure of the liquid in the peripheral groove is exerted equally in all directions of the valve and irrespective of what this pressure may be the valve is balanced.

Each of the valves is equipped with a relief valve positioned within and forming an integral part of each valve structure. These relief valves comprise a passage 32 communicating with the peripheral groove in the valve, which passage is closed by a ball 33 normally held in position to close the passage 32 by a spring 34. The spring 34 is seated in a retainer 35 threadedly engaging the valve, the adjustment of which retainer predetermines the pressure necessary to lift the ball 33 off its seat and permit the flow of liquid from the peripheral groove through the passage 32 into the fluid reservoir 19 in the interior of the casing.

Each of the valves is operated in timed relation to the movement of the pistons in the repective pump or motor cylinders by means of cams which operate the valves by engaging a groove in each valve stem. During one complete revolution of each cam, each valve operated thereby is moved into position in which the intake port is in registry with the passage communicating with the respective pump or motor cylinder, and from thence into position in which this passage is in communication with the output port, and from this last named position to the starting point first mentioned, thus providing for the intake and discharge of the cylinder.

To better understand the operation of the valves, let it be assumed that at the instant a point on the periphery of the cam may be said to be at 0°, the peripheral groove in a valve operated by the cam is closed to both intake and discharge, and is in communication only with the passage communicating with its respective cylinder. At this moment the piston in the corresponding cylinder is on dead center at the top of its stroke. During rotation of the shaft a distance of 60° from this point the valve is being moved into a full open position, affording communication between the intake port and the passage communicating with the cylinder. This position is maintained for 60° of rotation of the shaft. At this point the valve begins its reverse stroke and at the 180° position the valve is again closed to both intake and discharge and the piston is on dead center at the bottom of its stroke. During continued rotation of the cam through the next 60° the valve opens to discharge during the upward stroke of the piston, and is wide open or in position affording full communication between the passage communicating with the cylinder and the discharge port for a period of 60° rotation, from which point the valve again reverses direction as the piston reaches the top of its stroke at the point of 0°. A development of the periphery of the cam 43, which operates the valves 38 for the motor, is illustrated in Figure 11. It will be noted that the positions of the valve stems 49 correspond to the positions of the valves for the motor cylinders 37 shown in Figure 10. The cam 43 is driven by a mechanism which permits it to function also as a reversing mechanism, presently to be described. The cam 26, which operates the valves 24 for the delivery pump, is bolted to the centrifugal pump 22 keyed to the shaft 7 and is rotated thereby.

Figure 12:
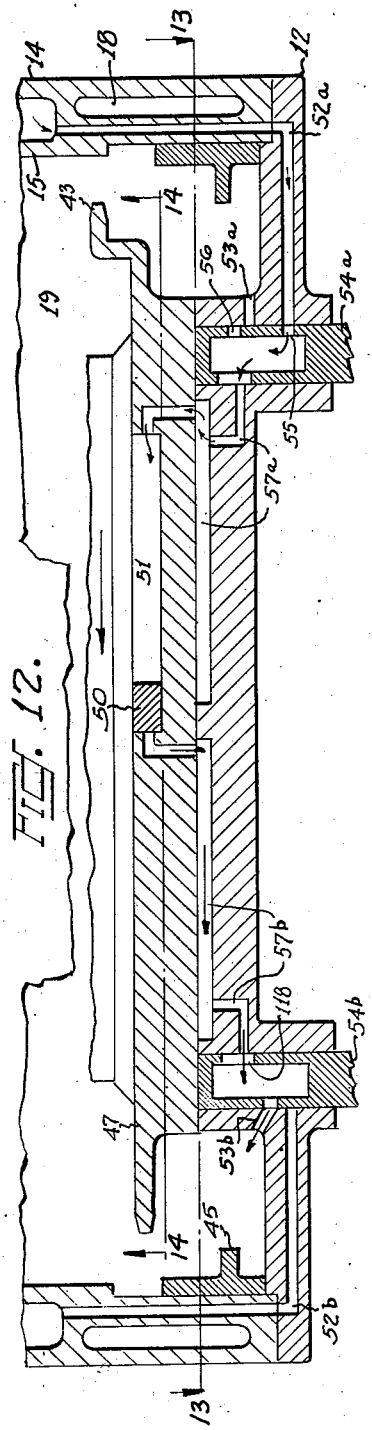
Figure 12 is a schematic sectional elevation of the cam for operating the valves for the motor, and particularly illustrating the reversing mechanism for operating the valves in timed relation with reverse rotation of the driven shaft.
Figure 14:
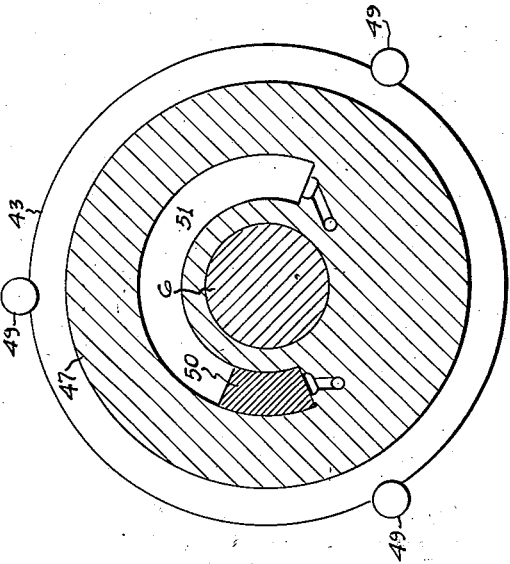
Figure 14 is a sectional elevation taken transversely of the transmission unit on the line 14—14 of Figure 12.
Figure 13:
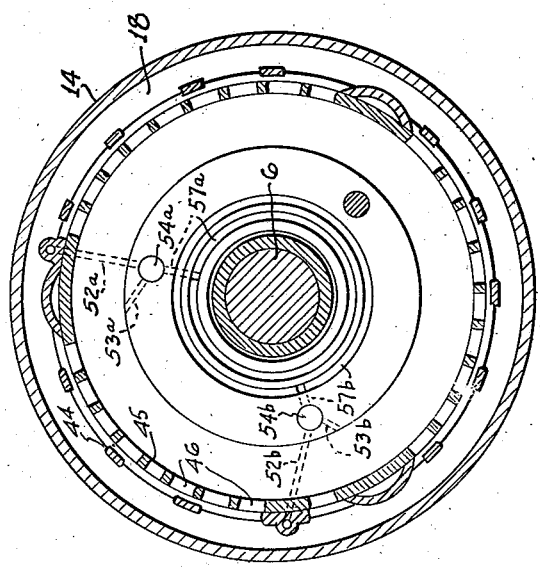
Figure 13 is a sectional elevation taken transversely of the transmission unit on the line 13—13 of Figure 12.

The cam 43 which operates the valves 38 for the motor comprises the peripheral edge of a disc 47 which functions as a reversing mechanism for reversing the action of the pistons 85 in the motor cylinders to cause the vehicle to be driven in a reverse direction. To accomplish this the disc is rotated relative to the driven shaft 6 so that a point on its peripheral surface is removed a distance of 180° from its position when the vehicle is being driven in a forward direction. When the cam is thus rotated 180° the operation of the valves 38 is reversed and the pistons of the motor are caused to drive the driven shaft in reverse direction. The reversing mechanism is in the form of a disc 47, the peripheral edge of which constitutes the cam 43 which operates the valves 38 by engaging grooves 48 in the valve stems 49. The disc 47 and the cam 43 are driven by a stud 50 forming a part of the driven shaft, which stud drives against the end of a semicircular groove 51 milled in the face of the reversing disc 47. Fluid from the pressure chamber 17 is admitted to the groove 51 by way of passages 52a or 52b and is exhausted from the groove 51 into the reservoir 19 by way of exhaust passages 53a or 53b, according to the position of the reversing valves 54a and 54b. This structure is best illustrated in Figures 12 and 13. The reversing valve 54a is provided with intake port 55 and exhaust port 56. In valve 54b one port 118 serves as either intake port or exhaust port according to the position of the valve. In Figures 12 and 14 the setting of the reversing valves 54a and 54b is such that the vehicle is being driven in a forward direction. In this position fluid is admitted to the groove 51 from the pressure chamber 17 by way of the passage 52a, valve 54a and communicating passages 57a. Fluid is exhausted from the groove 51 by way of communicating passages 57b, valve 54b and exhaust passage 53b. To rotate the disc 47 to cause the vehicle to be driven in reverse, the valves 54a and 54b are moved into the position wherein fluid from the pressure chamber 17 is admitted to the groove 51 through the passage 52b, valve 54b and communicating passages 57b, and fluid is exhausted from the groove 51 through communicating passages 57a, valve 54a and exhaust passage 53a. The setting of the valves determines the direction from which pressure is admitted to the groove 51 and so determines the relative position of the reversing disc 47. When the fluid is admitted to the space between the stud 50 and the adjacent end of the groove 51, the end of the groove 51 is forced away from the stud 50 and so rotates the disc 47 until the opposite end of the groove 51 contacts the opposite edge of the stud. The reversing disc is thereby rotated 180° to change the timing of the valves 38 to cause the shaft 6 to be driven in the opposite direction. The valves 54 are operated by means of valve stems 58 which project through the rear cover 12 and are operated by a mechanism presently to be described.

Fluid is admitted to the pump cylinder 23 from the suction chamber 16 by way of an intake port 29, and is discharged from the pump cylinders 23 to the pressure chamber 17 by way of the output port 30. These ports are designed to be brought into communication with the pump cylinders 23 by way of peripheral grooves 28 in each valve 24 and passages 31 communicating with the pump cylinders. As has been stated, the intake port 29 and the output port 30 form grooves in the wall of the valve casing so that the pressure of the liquid in each groove is applied equally around the periphery of the valve. Likewise the passage 31 communicating with the pump cylinders forms a groove in the wall of the valve casing in the same manner as do the intake and output ports.

The pressure chamber 17 is in communication with the output ports 30 of each of the pump cylinders, and is also in communication with the intake ports 40 for each of the motor cylinders, so that fluid discharged from any one of the pump cylinders 23 may be admitted to any one of the motor cylinders 37. This may best be understood by reference to Figure 10, wherein it will be seen that the pressure chamber, as do all of the fluid chambers, extends all the way around the casing. From the pressure chamber 17 the fluid enters the motor cylinders 37 by way of valves 38, the construction of these valves being identical with that of the valves 24 for the delivery pump. The intake port 40 and output port 42 for the motor cylinders, together with the passage 41 communicating with the motor cylinders 37, form channels or grooves in the valve casing, as hereinbefore described in connection with the description of the valves 24 for the pump cylinders, so that pressure is applied equally around the periphery of each valve 38. Pressure admitted to the peripheral groove 39 in each valve 38 is exerted equally in all directions, creating a balanced valve.

From the discharge chamber 18 the fluid is exhausted to the reservoir 19 interiorly of the casing by way of ports 44 which are opened and closed by means of a control valve 45 having ports 46 adapted to be brought into registry with the discharge ports 44. The control valve 45 is best illustrated in Figures 4, 12 and 13, wherein it will be seen that it is in the form of a ring closely fitting the inner wall of the casing and having a multiplicity of the ports 46 opening therethrough. The valve is so designed that when pressure is applied thereto, as when the valve is being opened or closed, the valve is balanced and is readily responsive to its control mechanism. Because of the multiplicity of ports 46 opening through the wall of the valve, fluid discharging from the discharge chamber 18 to the reservoir 19 has a balanced reaction on the valve, the pressure applied thereby exerting no end thrust action on the valve.

For a portion of its length the drive shaft 7 is hollow, and slidably mounted therewithin is a spirally threaded nut 59 to which is secured an actuating sleeve 60 slidably mounted upon the shaft 7 and designed to be moved longitudinally thereover between the front cover 10 and the housing for the flywheel 3. The shaft 7 is slotted as at 61 to receive the pin 62 for interconnecting the nut 59 and the sleeve 60. The nut 59 engages a spirally threaded shaft 63 and is the means by which the shaft 63 is turned about its axis. Adjacent the inner end of the shaft 63 is an eccentric 64 rotatably mounted in a bushing 65 which is slidably mounted in a recess 73 in the block 72 and permitted limited movement transversely thereof. As the shaft 63 and eccentric 64 are rotated by movement of the nut 59 this bushing 65 moves from side to side of the recess 73 to permit rotative movement of the eccentric 64. By reason of the construction just described movement of the actuating sleeve 60 in a direction toward the cover 10 causes rotation of the shaft 63, which in turn displaces the eccentric from the neutral position illustrated in Figure 7 into the full stroke position illustrated in Figure 6. It will be appreciated that between these two points there is a considerable range of degree of eccentricity to which the eccentric may be moved. In other words, the axis of the eccentric may be brought into axial alignment with the drive shaft 7 or moved out of alignment therewith by rotation of the shaft 63 whereby the degree of eccentricity may be varied from zero upwardly.

It will be noted that the nut 59 on the shaft 63 is mounted eccentrically of the shaft 7, and that likewise the opposite end portion of the shaft 63 is eccentrically mounted in the bushing 120 which is designed to transfer the load of the drive shaft assembly to the bearing 20 at the inner end of the shaft. As illustrated in Figure 15, the shaft 63 has been rotated to move the eccentric 64 into the position of greatest eccentricity, which is the position also illustrated in Figure 6. In Figure 15 the center line of the shaft 7 is the center line of rotation. The center line of the eccentric 64 is the axis of the piston assembly and the distance of the center line of the eccentric 64 from the center line of the drive shaft 7 is equal to one half the length of stroke of the pistons in the delivery pump. Movement of the actuating sleeve 60 toward the vehicle engine serves to rotate the shaft 63 relative to the shaft 7 and moves the eccentric 64 into axial alignment with the shaft 7, thus bringing the pistons of the delivery pump into neutral position. In neutral position the block 72 is in axial alignment with the drive shaft 7 and functions merely as a bearing for the connecting rods.

Each of the pump cylinders 23 is provided with a piston 25 and these pistons are actuated by connecting rods 66 which are connected with the pistons by means of wrist pins 67 in the usual manner. The inner ends of the connecting rods 66 are in the form of circular segments 68 which are arranged to have arcuate sliding movement over the bushing 119 to which they are secured by means of collars 69. The end of the shaft 7 is provided with a transverse groove 70 which receives projections 71 on the face of the block 72 to provide the driving connection between the shaft 7 and the pistons 25.

Figure 6:
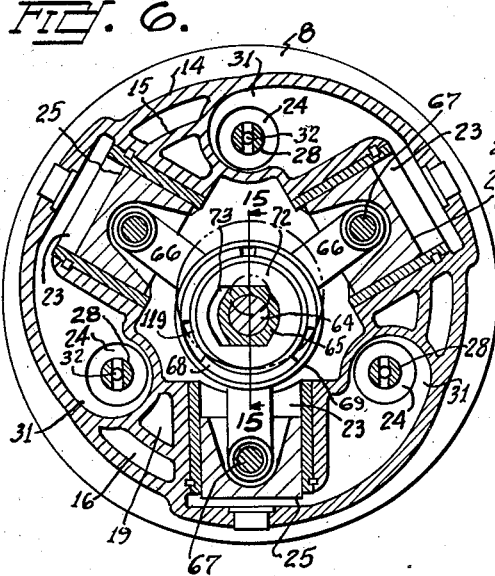
Figure 6 is a sectional elevation taken transversely of the transmission unit on line 6—6 of Figure 4, illustrating the position of the eccentric with the pistons of the delivery pump in full stroke position.
Figure 7:
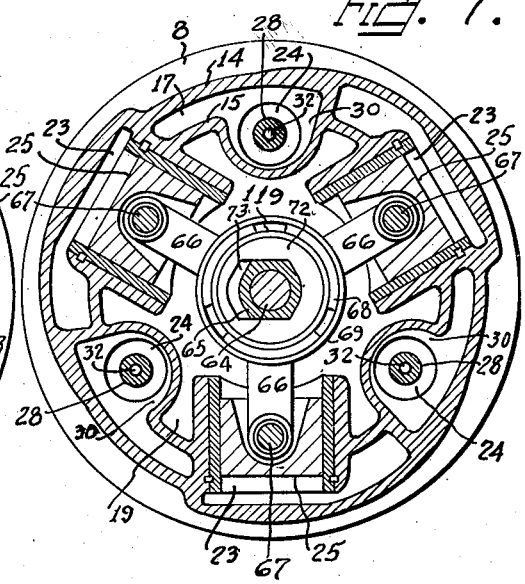
Figure 7 is a sectional elevation taken transversely of the transmission unit on line 7—7 of Figure 4, illustrating the position of the eccentric with the pistons of the delivery pump in neutral position.
Figure 8:
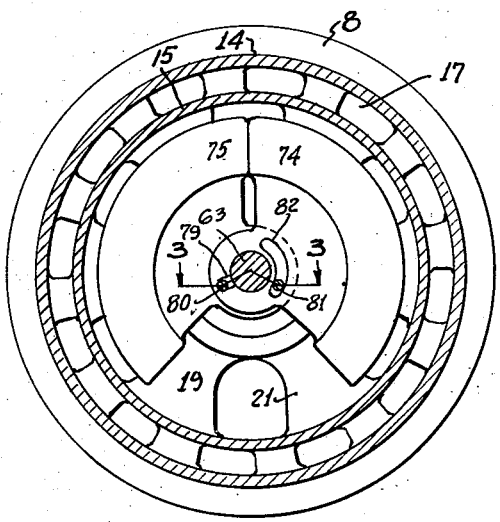
Figure 8 is a sectional elevation taken transversely of the transmission unit on line 8—8 of Figure 4, illustrating the position to which the counterweights are rotated when the pistons of the delivery pump are moved to full stroke position.
Figure 9:
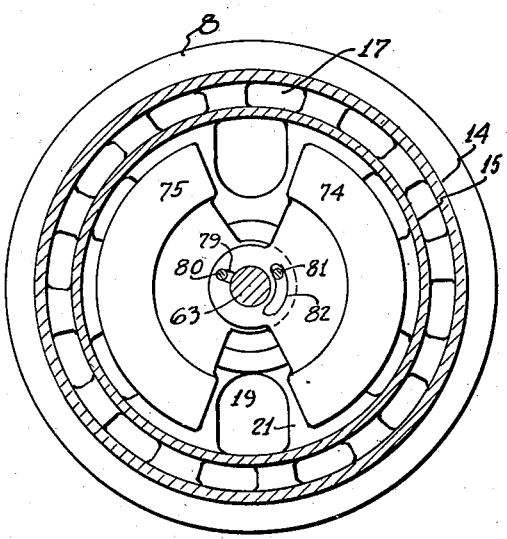
Figure 9 is a sectional elevation corresponding to Figure 8, illustrating the position of the counterweights when the pistons of the delivery pump are in neutral position.

Movement of the eccentric 64 out of alignment with the drive shaft 7 to vary the stroke of the pistons 25 in the delivery pump causes the axis of the piston assembly to be moved out of axial alignment with the center of rotation, thereby destroying the balance of the transmission unit. To overcome this difficulty applicant has provided counterweights 74 and 75 which are rotatable relative to the drive shaft to counterbalance the eccentricity of the piston assembly. Reference to Figures 3, 8, 9 and 15 will disclose the fact that each of these counterweights is made in the shape of a segment of a circle and that they are mounted in overlapping or face to face relation at their centers. Whereat they are mounted on the bushing 120, whereas their major portions are in alignment transversely of the transmission unit. For controlling the movement of these counterweights there is secured to the block 72, as by a pin 76, a plate 77. This plate 77 has driving engagement with the bushing 120 by means of a tongue and groove connection 78. Affixed to the plate 77 at one side of the bushing 120, so as to project into a recess 79 in the counterweight 74, is a pin 80. At the opposite side of the bushing 120 is a pin 81, which projects from the plate 77 through an arcuate opening 82 in the counterweight 74 into engagement with the counterweight 75. Movement of the eccentric 64 causes a lateral displacement of the block 72 and plate 77. This lateral movement of the plate 77 causes the pins 80 and 81 to rotate the respective counterweights actuated thereby about the axis of the bushing 120. By this mechanism there is imparted to the counterweights a rotative movement in timed relation to the displacement of the piston assembly from a coaxial or neutral position, thereby counterbalancing the piston assembly whenever same is moved out of coaxial alignment with the center of rotation. When the axis of the eccentric is in axial alignment with the shaft 7, so that the pistons are in neutral position illustrated in Figure 7, the position of the counterweights 74 and 75 corresponds to that illustrated in Figure 9. When the eccentric has been displaced so that the piston assembly is moved into full stroke position as illustrated in Figure 6, the counterweights assume the position illustrated in Figure 8.

The piston assembly for the motor is mounted upon a fixed eccentric 83 and to counterbalance the offset position of the pistons there is provided a counterweight 84 keyed to the driven shaft 6. Since the eccentricity of the piston assembly for the motor is invariable, the counterweight 84 is mounted permanently in fixed relation thereto. The motor cylinders 37 are equipped with pistons 85 which are actuated by connecting rods 86, the pistons being secured thereto as by means of wrist pins 87. The inner ends of the connecting rods 86 are in the form of circular segments 88 designed to have arcuate sliding movement over a bushing 89 forming a wearing surface upon the eccentric 83. The segmental portions of the connecting rods are held in sliding engagement with the bushing 89 by means of collars 90.

*Control mechanism*

The length of stroke of the pistons in the delivery pump, and the operation of the control valve, may be controlled by mechanism operable either manually by the operator of the vehicle or by mechanism operated entirely by the vacuum created by the vehicle engine, or by a combination of manually and automatically operated controls. The control mechanism illustrated on the accompanying drawings includes the manifold 2, a vacuum tank 91 connected therewith, a mechanically operated slide valve 92, and a vacuum unit 93. Air is exhausted from the vacuum tank 91 through the pipe line 95. Connected into the pipe line 95 is a valve 94 which controls the mechanism for operating the control valve 45. This valve 94 is open to the atmosphere through one end thereof, and is opened and closed by a piston 96 to which is connected a piston rod 97. The rod 97 is secured to a foot pedal 99 which in turn is under control of a piston 98 in the vacuum unit 93. A piston rod 121 interconnects the foot pedal 99 and the piston 98 in the vacuum unit 93, and intermediate its length the rod 121 is secured to a lever 100 having a bifurcated arm 101 adapted to engage and move the actuating sleeve 60. By this means, whereby the control elements are mechanically connected to the foot pedal 99, the operation of the vehicle may be manually controlled. A pipe line 102 interconnects the valve 94 and an auxiliary vacuum unit 103, operable within which vacuum unit 103 is a piston having a piston rod 104 secured to a bifurcated lever 105 designed to operatively engage a grooved control member 106 for operating the control valve 45. The piston rod 104 is maintained in extended position (in which position the control valve 45 is open) by a tension spring 107 and is moved against the force of the spring 107 by the vacuum created by the engine whenever the piston 96 in the valve 94 is moved into position to allow communication between the pipe line 102 and the pipe line 95 leading to the manifold. A pipe line 108 communicating with the vacuum tank 91 is equipped with a shut off valve 109 on the instrument panel of the vehicle and from thence leads to a port midway of the slide valve 92. The slide valve 92 is open to the atmosphere at both ends thereof and is equipped with a double ended piston 110 adapted to be moved in one direction (to the left in Figures 18 to 21) by a compression spring 111 and in the opposite direction by a flexible cable 112 attached to the end of a pin 113 which projects through the foot pedal 99 and by means of which the cable 112 may be actuated to move the piston 110 against the action of the spring 111. A pipe 114 connects the inner end of the vacuum unit 93 and a port midway of the slide valve 92; and a pipe 115 provides communication between the opposite or outer end of the vacuum unit 93 and the slide valve 92.

To bring the vehicle to a stop the pin 113 is moved downwardly, thereby moving the double ended piston 110 in the slide valve 92 in opposition to the action of the spring 111. The respective positions of the control elements when the vehicle has been stopped, and the transmission of power is at zero, is illustrated in Figure 18, in which positions the control elements have operated to disconnect the drive shaft from the driven shaft.

Downward movement of the pin 113 moves the double ended piston 110 into position wherein air is admitted to the outward end of the vacuum unit 93 through the pipe 115, while the inner end of the vacuum unit 93 is placed in communication with the vacuum tank 91 through pipes 108 and 114. Movement of the piston 98 in response to the vacuum created in the inner end of the vacuum unit 93 causes the rod 121 to so move the lever 100 as to cause the actuating sleeve 60 to be moved toward the flywheel 3, whereby the shaft 63 is rotated to bring the eccentric 64 into axial alignment with the drive shaft 7, thereby placing the piston assembly of the delivery pump in neutral position. Thereupon the valve 109 is closed to avoid drawing a vacuum in the outer end of the vacuum unit 93 when the pin 113 is released and consequent movement of the double ended piston 110 in response to the action of the spring 111 provides communication between the line 108 and the pipe 115.

It should be stated that the foot pedal 99, by and of itself, is not actuated by the operator. Rather, the foot pedal is under control of the piston 98 in the vacuum unit 93. For example, when the operator depresses the pin 113, the foot pedal 99 moves downwardly to the floorboard, this movement, however, being due to the movement of the piston 98 as air is exhausted from the inner end of the vacuum unit 93 and the outer end thereof is opened to the atmosphere through the pipe 115. Likewise, it is true that the foot pedal follows the operator's foot upwardly, but this is due to the fact that as the pin 113 is released, movement of the piston 98 is reversed as air is exhausted from the outer end of the vacuum unit 93 and the inner end thereof opened to the atmosphere through the pipe 114.

Movement of the piston 98 toward the inner end of the vacuum unit 93 operates to move the piston 96 in the valve 94 toward the closed end of the valve and opens the end of the pipe line 102 to the atmosphere. Air being admitted through the pipe line 102 into the closed end of the auxiliary vacuum unit 103, the piston rod 104 is moved to extended position by the spring 107, thereby causing the bifurcated lever 105 to move the control member 106 and cause the control valve 45 to move into position to open the exhaust ports 44, thus permitting fluid to circulate from the discharge chamber 18 into the reservoir 19.

To begin movement of the vehicle the operator must first depress the pin 113 and open the valve 109. Thereupon the operator slowly raises his foot, thereby releasing the pin 113 and allowing the spring 111 to move the double ended piston 110 into position whereby air is admitted to the inner end of the vacuum unit 93 through the pipe 114, while the outer end of the vacuum unit 93 is placed in communication with the vacuum tank 91 through pipe lines 115 and 108. As the foot is raised (Figure 20) the vacuum created in the outer end of the vacuum unit 93 moves the piston 98 toward the outer end of the vacuum unit 93 which in turn imparts movement to the lever 100, thereby moving the actuating sleeve 60 toward the transmission unit and rotating the shaft 63 to move the eccentric 64 out of axial alignment with the drive shaft 7. Thereupon displacement of the piston assembly in the delivery pump will cause the delivery pump to commence the delivery of fluid under pressure to the motor. It will be noted that not until the piston 98 in the vacuum unit 93 is in its fully extended position is the valve 94 opened by outward movement of the piston 96 to permit communication between the pipe line 102 and the manifold 2, whereby vacuum is created in the inner end of the auxiliary vacuum unit 103 to overcome the action of the spring 107 and move the lever 105 to cause the control member 106 to close the valve 45. It is important that the control valve 45 be not closed until after the piston assembly for the delivery pump has been moved into full stroke position.

After the vehicle is in operation, the operation of the control elements is fully automatic. In this connection it should be stated that when the control valve 45 is moved into position to close the exhaust ports 44 the transmission unit is fluid locked, and the delivery pump and motor and cylindrical casing rotate as one unit at the same speed as the drive shaft 7 with no moving parts therewithin. This condition prevails when the control elements are in the positions illustrated in Figure 21. In the event of a lessening of the vacuum created by the vehicle engine, in which case the tension of the spring 107 is sufficient to overcome the vacuum at the inner end of the auxiliary vacuum unit 103, the spring acts to overcome the pull of the vacuum and moves the lever 105 which coacts with the control member 106 to open the control valve 45. Thus movement of the control valve is governed by the amount of vacuum created in the manifold.

A check valve 116 in the line 95 prevents a lessening of the vacuum created in the tank 91 so that the vacuum in the outer end of the vacuum unit 93 is not disturbed by sudden changes of the vacuum created in the manifold. Therefore, because a constant vacuum is maintained in the vacuum tank 91 and exerts a constant pull on the piston 98 in the vacuum unit 93, the length of the stroke of the pistons in the pump cylinders is not affected by the increase or decrease of vacuum in the manifold of the engine.

Operation

Fluid is introduced into the cylindrical casing by way of ports 117 in an amount sufficient to practically fill the casing, leaving room, however, for expansion of the fluid.

When starting the motor it is necessary either that the shut off valve 109 be closed, or that the pin 113 be depressed to open the slide valve 92 to place the inner end of the vacuum unit 93 in communication with the vacuum tank 91 through pipes 114 and 108. Thus the eccentric 64 is maintained in axial alignment with the drive shaft and the piston assembly of the delivery pump is in neutral position. However, rotation of the drive shaft 7 operates the centrifugal pump 22 and the cam 26, and fluid is delivered to the suction chamber 16 under pressure sufficient to supply the cylinders 23 as the valves 24 are opened to suction. The cam 26 for operating said valves 24 at once times the valves so that they open and close in proper relation to the stroke of the pistons in the pump cylinders. Thereupon, as the delivery pump begins operation, fluid is admitted to the pump cylinders from the suction chamber and is discharged therefrom into the pressure chamber for delivery to the cylinders of the motor.

With the pin 113 depressed and the foot pedal 99 at the floor board, the shut off valve 109 may be opened, whereupon the vehicle may be placed in motion by raising the foot and permitting the pin 113 to return to extended position. If the pin 113 be released momentarily and then again be depressed, the piston 110 in the slide valve 92 may be moved into position to close both the pipe 114 and the pipe 115. This action will serve to first relieve the vacuum in the inner end of the vacuum unit 93 and partially exhaust the air from the outer end thereof, and thereupon close the vacuum unit to both suction and air. When this occurs, the piston 98 in the vacuum unit 93 will be held in an intermediate position and the piston assembly in the delivery pump be displaced to a degree intermediate its neutral and full stroke positions, at the will of the operator. The effect is to maintain a desired driving ratio higher than that to be obtained when the piston assembly is in full stroke position. To secure this result it is necessary that the pin 113 be held in the intermediate position above mentioned. If the pin 113 be permitted uninterrupted upward movement the piston assembly in the delivery pump will be moved into full stroke position.

As has been stated, the impeller 22 is keyed to the drive shaft 7 and is driven thereby. The fluid delivered by the impeller 22 reacts against the casing in the manner of a turbine and drives the casing in the forward direction. The relative rotation of the cylindrical casing with reference to the drive shaft, together with the length of stroke of the pistons in the delivery pump, determines the volume of fluid delivered by the delivery pump to the motor. The speed of rotation of the driven shaft is determined by the volume of fluid delivered to the motor and the speed of rotation of the casing. After the pistons of the delivery pump are in full stroke position the driving ratio between the drive shaft and driven shaft is determined entirely by the load on the vehicle engine.

The displacement ratio of the delivery pump with respect to the motor is as 1:2, which is obtained in the illustrated embodiment by using pistons of equal diameter in both pump and motor, and giving to the motor pistons a stroke of two inches and to the pistons of the delivery pump a full stroke of one inch. By varying the length of stroke of the pistons in the delivery pump from zero upwardly, the driving ratio may be varied from zero upwardly. After the vehicle has been put in motion, and the pistons of the delivery pump have been moved into full stroke position, the driving ratio is controlled automatically be means of the mechanism which controls movement of the control valve 45, by virtue of the changing rotational speed of the casing as the control valve 45 restricts the fluid flow to varying degrees. These last mentioned changes in driving ratio are effected without the intervention of the operator and are solely dependent upon the ability of the vehicle engine to meet the road requirements.

By mounting a simple clutch mechanism (not shown) between the vehicle engine and the transmission unit, and so mounting the pistons of the delivery pump as to cause them to deliver at short fixed stroke, the driving ratio would be entirely controlled by operation of the control valve 45. Also, by use of a fixed stroke delivery pump, instead of employing an external conventional clutch to obtain a "neutral", an adjustable fluid control may be utilized to break the driving connection with the driven shaft.

To drive the vehicle backwards, a lever 122 is manipulated to operate the reversing valves 54a and 54b to cause fluid to be admitted to the groove 51 in the face of the reversing disc 47 in the manner hereinbefore described. The valves are connected to a grooved collar 123, which is under control of a bifurcated arm 124 designed to engage in the groove. The bifurcated arm 124 and the lever 122 are connected by suitable linkage (not shown). When the operation of the valves 38 for the motor has been timed to cause the driven shaft 6 to be driven in a reverse direction, it becomes necessary to apply a brake 125 to hold the casing stationary. The brake 125 engages a brake drum 126 bolted to the cylindrical casing and is operated in an ordinary manner by means of a brake lever 127. During all times that the vehicle is being driven backwards, the control valve 45 is held open to permit circulation of fluid from the motor cylinders to the reservoir 19.

Although the particular embodiment of the invention hereinabove described is illustrated for use in an automotive vehicle, it is not intended to limit the application of the invention thereto. Neither is it intended to limit the application of the invention to a construction in which the pistons of the delivery pump and motor have a stroke of specified lengths; or in which it is imperative that the length of stroke of the pistons of the delivery pump, rather than of the pistons for the motor, be variable to create a driving ratio. In other words, it is clearly within the purview of the invention that the length of stroke of the pistons in the motor be governed by a control mechanism, instead of, or as well as, the length of stroke of the pistons of the delivery pump. Furthermore, the invention may be used, either in its entirety or in part, and either with or without modification, for industrial and marine purposes as well, and with prime movers other than internal combustion engines, without departing from the spirit of the invention; and I deem myself entitled to all such uses, modifications and/or variations as fall within the spirit and scope of the appended claims.

Having now described my invention and in what manner the same may be used, what I claim as new and desire to protect by Letters Patent is:

1. In a fluid transmission mechanism having a drive shaft with a radial cylinder and piston fluid pump assembly thereon, a driven shaft with a radial cylinder and piston fluid motor assembly thereon, movable means to vary the crank throw of the pump pistons and a valve to control the pumped fluid and when closed to establish a fluid locked condition, a first vacuum cylinder to operate said movable means, a manually operable selector valve to control said first vacuum cylinder, a second vacuum cylinder to operate said control valve, and a second selector valve operated by said first vacuum cylinder and said movable means to cause said second vacuum cylinder to close said valve only when said movable means is in a predetermined position, whereby the fluid locked condition will not occur until said movable means has produced a predetermined crank throw.

2. In a fluid transmission mechanism having a member movable between two extreme positions to vary the transmission ratio, and a valve to control fluid flow in the transmission, a control system comprising means to progressively move said movable member to a selected position and to maintain said selected position, means to progressively close said valve to a selected position, and means operated by said first-named means to prevent the actuation of said valve-closing means until said movable member is in one of its extreme positions, said valve closing means, when actuated, being responsive to a predetermined operating condition of said fluid transmission.

3. A torque sensitive fluid transmission comprising a driving member, a fluid pump connected to said driving member, means for varying the effective displacement of said fluid pump, a driven member, a motor connected to said driven member, said motor being operated by fluid delivered by said pump for driving said driven member, conduits joining the pump and motor for conducting fluid therebetween, a valve for controlling the flow of fluid through said pump and motor and operable to fluid lock the transmission unit to create a direct drive between driving and driven members, vacuum cylinder means for urging said valve to closed position, valve means having one position to actuate said vacuum cylder means, and means interconnecting said pump control means and said valve means for moving said valve means to said one position only after said fluid pump has been placed in position for maximum displacement.

4. In a fluid transmission mechanism, a tubular drive shaft and a driven shaft, a series of cylinders arranged radially about each of said shafts, pistons operating in said cylinders and operatively connected to their respective shafts, a spirally threaded auxiliary shaft extending axially of said tubular shaft, an eccentric carried by said auxiliary shaft, a nut within said tubular shaft having engagement with the threads of said auxiliary shaft, an actuating collar slidably mounted on the drive shaft, means interconnecting the collar and said nut whereby movement of the collar causes a like movement of the nut and rotates said auxiliary shaft, and a cylindrical block mounted on said eccentric and movable laterally of said transmission unit by rotation of the eccentric, the pistons for one of said series of cylinders being connected to said block whereby rotation of said auxiliary shaft causes a variation in the length of stroke of the pistons in said cylinders.

5. In a fluid transmission mechanism, a tubular drive shaft and a driven shaft, a series of cylinders arranged radially about each of said shafts, pistons operating in said cylinders and operatively connected to their respective shafts, a spirally threaded auxiliary shaft extending axially of said tubular shaft, an eccentric carried by said auxiliary shaft, a nut within said tubular shaft having engagement with the threads of said auxiliary shaft, an actuating collar slidably mounted on the drive shaft, means interconnecting the collar and said nut whereby movement of the collar causes a like movement of the nut and rotates said auxiliary shaft, a cylindrical block mounted on said eccentric and movable laterally of said transmission unit by rotation of the eccentric, the pistons for one of said series of cylinders being connected to said block whereby rotation of said auxiliary shaft causes a variation in the length of stroke of the pistons in said cylinders, a counterweight for counterbalancing said pistons, said counterweight being rotatable relative to said shaft, and means interengaging said block and said counterweight for rotating said counterweight about said shaft as the block is moved by rotation of said eccentric.

6. In a fluid transmission mechanism, a drive shaft and a driven shaft, a series of cylinders arranged radially about each of said shafts, pistons operating in said cylinders and operatively connected to their respective shafts, an eccentric carried by one of said shafts, means for adjusting the eccentricity of said eccentric to vary the stroke of the pistons in one of said series of cylinders, a counterweight for counterbalancing the pistons operated by said eccentric, said counterweight comprising two elements mounted for limited rotation about said one shaft, and means for rotating said elements simultaneously with the adjustment of said eccentric.

7. In a fluid transmission mechanism, a drive shaft and a driven shaft, a variable throw crank on said drive shaft, a series of cylinders arranged radially about said drive shaft, pistons operating in each of said cylinders and operatively connected to said crank, said crank being movable into and out of coaxial alignment with the shaft to vary the length of stroke of said pistons in said cylinders, a counterweight for counterbalancing said pistons, said counterweight being movable relative to said shaft, and means for moving said counterweight simultaneously with the movement of the crank into and out of coaxial alignment with said shaft.

8. In a fluid transmission mechanism, a shaft rotatable therewithin, a variable throw crank on said shaft, a series of cylinders arranged radially about said shaft, a piston operating in each of said cylinders and operatively connected to said crank, means for moving said crank into and out of coaxial alignment with said shaft for varying the stroke of the pistons in said cylinders, a counterweight for counterbalancing said pistons, said counterweight being adjustable relative to said pistons according to the degree of eccentricity of said crank with respect to said shaft, and means within said transmission unit for controlling the adjustment of said counterweight.

9. In a fluid transmission mechanism, a drive shaft and a driven shaft, a delivery pump operatively connected to the drive shaft, a motor operatively connected to the driven shaft, a cylindrical casing enclosing said pump and said motor and rotatable relative to said shafts, a plurality of fluid chambers arranged circumferentially of said casing and communicating with said pump and motor, a fluid reservoir disposed centrally of said casing, a pump for pumping fluid from said reservoir to one of said chambers, and a valve for controlling the flow of fluid from another one of said chambers to said reservoir.

10. In a fluid transmission mechanism, a driving shaft carrying pistons, a driven shaft in axial alignment therewith also carrying pistons, a cylindrical casing rotatable about both of said shafts, said casing containing cylinders in one end coacting with the pistons on the driving shaft to form a delivery pump and containing cylinders in the other end coacting with the pistons on the driven shaft to form a receiving pump or fluid motor, the piston displacement of said motor being different from the piston displacement of said delivery pump, fluid passageways establishing a hydraulic connection between said delivery pump and said motor, and a valve to control the fluid flow from the motor cylinders, whereby torque may be transmitted from the driving shaft to the driven shaft in automatically varying ratios in accordance with the torque requirements of the driven shaft.

11. In a fluid transmission mechanism, a drive shaft and a driven shaft, a series of cylinders arranged radially about each of said shafts, pistons operating in said cylinders and operatively connected to their respective shafts, said drive shaft and pistons and cylinders constituting a pump and said driven shaft and pistons and cylinders constituting a motor, said two series of cylinders being integrally joined for common rotation about said shafts, and a valve for controlling the flow of fluid from the motor cylinders and operable to fluid lock the transmission mechanism to create a direct drive between driving and driven shafts.

12. A torque sensitive fluid transmission comprising a casing, a driving member, a fluid pump connected to said driving member, a driven member, a motor connected to said driven member, said motor being operated by fluid delivered by said pump for driving said driven member.

means defining a plurality of fluid chambers arranged within said casing, a valve for each said pump and motor and having separate port means providing communication between each said pump and motor and at least two of said fluid chambers, each said valve comprising a cylinder having means defining three substantially annular ports, and a piston-like member mounted within said cylinder having a substantially annular recess of such width as to uncover adjacent two of said ports, said piston-like member being movable to one position to provide communication between one of said chambers and said pump or motor, and being movable to a second position to provide communication between the other of said chambers and said pump or motor.

13. In a fluid transmission mechanism, a drive shaft and a driven shaft, a delivery pump operatively connected to said drive shaft, a motor operatively connected to said driven shaft, a cylindrical casing enclosing said pump and motor and rotatable relative thereto, a plurality of fluid chambers arranged circumferentially of said casing and communicating with said pump and motor, a valve for controlling the flow of fluid from said motor, said valve comprising a cylindrical sleeve having port means in substantially annular arrangement therearound and a second cylindrical sleeve closely fitting said first cylindrical sleeve and movable therewithin to cover said port means, and means to cause relative movement of said sleeves to open and close said ports.

14. In a fluid transmission mechanism having a plurality of cylinders disposed about a shaft, valves for said cylinders, operating means for said valves comprising a cam plate mounted on said shaft for limited relative rotation with respect thereto, an arcuate channel in one face of said cam plate concentric with and extending part way around said shaft, a stud on said shaft disposed within said arcuate channel and limiting the said relative rotation of said cam plate, a fluid duct opening into each end of said arcuate channel, and means for applying fluid pressure to each of said ducts selectively to effect said relative rotation of said cam plate.

15. In a fluid transmission mechanism, a plurality of cylinders disposed about a shaft, valves for said cylinders controlling the intake and egress of a fluid medium, means for operating said valves comprising a cam member carried by said shaft and shiftable to either one of two positions on said shaft to time said valves for either forward or reverse rotation of said shaft, respectively, and controllable fluid pressure means for shifting the position of said cam selectively to either of its two positions.

16. In a fluid transmission mechanism, a drive shaft and a driven shaft, a series of cylinders disposed about each of said shafts, said two series of cylinders being integrally joined for common rotation about said shafts, valves for said cylinders controlling the intake and egress of a fluid medium, means for operating the valves for the cylinders of one of said series comprising a cam member carried by one of said shafts and shiftable to either one of two positions to time said valves for either forward or reverse rotation of said shaft, respectively, means for shifting the position of said cam selectively to either one of its two positions, and means for arresting the rotation of said cylinders about said shaft.

17. In a fluid transmission mechanism, a drive shaft and a driven shaft, a delivery pump operatively connected to said drive shaft, a motor operatively connected to said driven shaft, a cylindrical casing enclosing said pump and motor and rotatable relative thereto, means defining a plurality of fluid chambers arranged within said casing, a valve for each said pump and motor having separate port means providing communication between each said pump and motor and at least two of said fluid chambers, means for regulating the operation of the valve for the motor to cause the motor to drive the driven shaft in either forward or reverse direction, and a valve for controlling the flow of fluid through said chambers, said valve in closed position operating to fluid lock said transmission to effect direct drive.

18. A torque-sensitive fluid transmission comprising a driving member, a fluid pump connected to said driving member, a driven member, a motor connected to said driven member, said motor being operated by fluid flow from the pump for driving said driven member, conduits joining the pump and motor for conducting fluid therebetween, a casing rotatably mounted around said pump, motor and conduits, means for moving said pump into and out of concentric relation with said driving member to vary the pumping action on the fluid, and a counterbalancing device movable relative to said pump to maintain dynamic balance in the transmission.

DANIEL F. McGILL.